US012658596B2

(12) United States Patent
Monroe et al.

(10) Patent No.: US 12,658,596 B2
(45) Date of Patent: Jun. 16, 2026

(54) TERAHERTZ BEAM STEERING ANTENNA ARRAYS

(71) Applicant: Massachusetts Institute of Technology, Cambridge, MA (US)

(72) Inventors: Nathan McKay Monroe, Cambridge, MA (US); Ruonan Han, Winchester, MA (US)

(73) Assignee: Massachusetts Institute of Technology, Cambridge, MA (US)

(*) Notice: Subject to any disclaimer, the term of this patent is extended or adjusted under 35 U.S.C. 154(b) by 12 days.

(21) Appl. No.: 18/832,373

(22) PCT Filed: Feb. 7, 2023

(86) PCT No.: PCT/US2023/012502
§ 371 (c)(1),
(2) Date: Jul. 23, 2024

(87) PCT Pub. No.: WO2023/158572
PCT Pub. Date: Aug. 24, 2023

(65) Prior Publication Data

US 2025/0112379 A1 Apr. 3, 2025

Related U.S. Application Data

(60) Provisional application No. 63/310,624, filed on Feb. 16, 2022.

(51) Int. Cl.
*H01Q 15/22* (2006.01)
*H01Q 15/24* (2006.01)
*H01Q 21/06* (2006.01)

(52) U.S. Cl.
CPC ............ *H01Q 15/22* (2013.01); *H01Q 15/24* (2013.01); *H01Q 21/065* (2013.01)

(58) Field of Classification Search
CPC ........ H01Q 15/14; H01Q 15/22; H01Q 15/24; H01Q 21/065
See application file for complete search history.

(56) References Cited

U.S. PATENT DOCUMENTS 6,384,787 B1 * 5/2002 Kim ........................ H01P 1/184
343/781 R
10,749,255 B2 8/2020 Ahmed et al.
(Continued)

FOREIGN PATENT DOCUMENTS

WO 2020/176595 A1 9/2020

OTHER PUBLICATIONS

International Search Report and Written Opinion mailed May 10, 2023 in corresponding PCT application No. PCT/US2023/012502.
(Continued)

*Primary Examiner* — Hoang V Nguyen
(74) *Attorney, Agent, or Firm* — Nields, Lemack & Frame, LLC

(57) ABSTRACT

A terahertz imaging system is disclosed. The terahertz imaging system includes a terahertz antenna array, made up of a plurality of antenna elements. Each antenna element includes a patch antenna, a one bit phase shifter, and a plurality of storage elements. The storage elements are used to store a plurality of phase states that are supplied to the one bit phase shifter. The one bit phase shifter is configured to either shift the phase of the incoming signal by 90 or 270, depending on the value of the phase state. The one bit phase shifter is also bidirectional, allowing it to phase shift transmitted signals and reflected signals. A plurality of these antenna elements are disposed in a semiconductor device, where the top metal layer is exposed. This top metal layer is used to create the patch antennas.

20 Claims, 15 Drawing Sheets

(56) References Cited

U.S. PATENT DOCUMENTS

| | | | | |
|---|---|---|---|---|
| 10,962,610 | B2 | 3/2021 | Ibrahim et al. | |
| 10,985,819 | B1 | 4/2021 | Durbin et al. | |
| 2012/0086608 | A1* | 4/2012 | Cathelin | H01Q 3/24 343/893 |
| 2013/0169485 | A1 | 7/2013 | Lynch | |
| 2014/0049311 | A1 | 2/2014 | Yang et al. | |
| 2019/0101640 | A1* | 4/2019 | Devaraj | H01Q 19/10 |
| 2019/0348768 | A1 | 11/2019 | Behdad et al. | |
| 2020/0006864 | A1 | 1/2020 | Naruse | |
| 2020/0243968 | A1 | 7/2020 | Behdad et al. | |
| 2020/0296823 | A1 | 9/2020 | Kamgaing et al. | |
| 2021/0280972 | A1 | 9/2021 | Behdad et al. | |

OTHER PUBLICATIONS

Fu et al., "Terahertz Beam Steering Technologies: From Phased Arrays to Field-Programmable Metasurfaces," Advanced Optical Materials, vol. 8, iss. 3, 22 pages, Aug. 2019.

Holloway et al., "Innovations in Terahertz Interconnects: High-Speed Data Transport Over Fully Electrical Terahertz Waveguide Links," IEEE Microwave Magazine, vol. 21, No. 1, pp. 35-50, Jan. 2020.

Ibrahim et al., "29.8 THzID: A 1.6mm2 Package-Less Cryptographic Identification Tag with Backscattering and Beam-Steering at 260GHz," 2020 IEEE International Solid-State Circuits Conference—(ISSCC), San Francisco, CA, USA, pp. 454-456, Feb. 2020.

Matheson, Cryptographic "tag of everything" could protect the supply chain, MIT News, Massachusetts Institute of Technology, Feb. 2020.

Romanofsky, Advances in Scanning Reflectarray Antennas Based on Ferroelectric Thin Film Phase Shifters for Deep Space Communications, Proceedings of the IEEE, vol. 95, iss 10, Oct. 2007.

Wan et al., Field-programmable beam reconfiguring based on digitally-controlled coding metasurface, Scientific Reports, vol. 6, 8 pages, Feb. 2016.

Wang et al., "Large-scale terahertz active arrays in silicon using highly-versatile electromagnetic structures," 2017 IEEE International Electron Devices Meeting (IEDM), San Francisco, CA, USA, 38 pages, Dec. 2017.

Yi et al., "Emerging Terahertz Integrated Systems in Silicon," IEEE Transactions on Circuits and Systems I: Regular Papers, vol. 68, No. 9, pp. 3537-3550, Sep. 2021.

Yu et al., "mmWave and sub-THz Technology Development in Intel 22nm FinFET (22FFL) Process," 2020 IEEE International Electron Devices Meeting (IEDM), San Francisco, CA, USA, 5 pages, Dec. 2020.

Canadian communication dated Aug. 22, 2025 in corresponding Canadian patent application No. 3,251,243.

* cited by examiner

TERAHERTZ BEAM STEERING ANTENNA ARRAYS

This application claims priority of U.S. Provisional Patent Application Ser. No. 63/310,624, filed Feb. 16, 2022, the disclosure of which is herein incorporated by reference in its entirety.

FIELD

This disclosure describes a terahertz beam steering antenna array.

BACKGROUND

The Terahertz spectrum of electromagnetic waves, ranging in frequency from approximately 0.1 THz to 10 THz, has been gaining increasing attention in the scientific and engineering research communities for a number of reasons, including bandwidth availability, relatively short wavelength, and interesting wave-matter interaction properties, and others. The efficient generation and sensing of Terahertz waves has proven to be an elusive achievement. At the same time, THz systems have the potential to enable a broad range of applications such as communications, pathogen sanitation, space-based applications, in addition to numerous imaging applications.

Terahertz imaging is an emerging technology with expanded research interest over the past decade. Terahertz imaging systems have been demonstrated with applications in security, military, spectroscopy, nondestructive testing, medical imaging, and others. In such systems, THz waves are directed at sample targets with received signal taken either by reflection or transmission through a target to create an array of pixels. Most common approaches create a matrix of such pixels to generate an image. These systems rely nearly exclusively on motorized beam steering, with approaches such as motorized reflector mirrors, gimbaled sample stage, or actuated lenses to steer a radiated beam. These approaches, while effective, are in general large, heavy and expensive, with large power consumption and slow image acquisition, and reliability issues associated with physical movement.

Therefore, a terahertz antenna array that comprises hundreds or thousands of antenna elements that employ phased array beam steering techniques would be beneficial in these applications.

SUMMARY

A terahertz imaging system is disclosed. The terahertz imaging system includes a terahertz antenna array, made up of a plurality of antenna elements. Each antenna element includes a patch antenna, a one bit phase shifter, and a plurality of storage elements. The storage elements are used to store a plurality of phase states that are supplied to the one bit phase shifter. The one bit phase shifter is configured to either shift the phase of the incoming signal by 90° or 270°, depending on the value of the phase state. The one bit phase shifter is also bidirectional, allowing it to phase shift transmitted signals and reflected signals. A plurality of these antenna elements are disposed in a semiconductor device, where the top metal layer is exposed. This top metal layer is used to create the patch antennas. The interface of the semiconductor device is designed to allow a plurality of these semiconductor devices to be mounted as an array on a printed circuit board.

According to one embodiment, a semiconductor device is disclosed. The semiconductor device comprises a semiconductor substrate; and a plurality of metal layers, including a top metal layer which is exposed; wherein the top metal layer is formed as a plurality of patch antennas, and wherein a plurality of storage elements and a one bit phase shifter is disposed in the semiconductor substrate beneath each respective patch antenna, wherein the plurality of storage elements stores a plurality of phase states that are supplied to the one bit phase shifter. In some embodiments, the plurality of storage elements disposed beneath each respective patch antenna contains at least 1000 phase states. In some embodiments, the plurality of patch antennas are arranged as a grid having a first number of rows and a second number of columns.

In some embodiments, each storage element of the plurality of storage elements comprises a shift register. In certain embodiments, the semiconductor device has two modes: a load mode wherein all shift registers in the semiconductor device are arranged in series and data are loaded sequentially into all shift registers, and a cyclic mode wherein an output of each shift register is provided to an input of that shift register. In some embodiments, the plurality of storage elements comprises a random access memory (RAM). In some embodiments, each patch antenna is a rectangle having two sets of parallel sides and comprises three contact points, a first contact point (P1); a second contact point (P2) disposed at a midpoint of a first side; and a third contact point (P3) disposed at a midpoint of a second side, opposite the first side, and wherein the first contact point (P1) is disposed at a midpoint of a side that is perpendicular to the first side and the second side. In some embodiments, the one bit phase shifter comprises two field effect transistors (FETs), wherein a first transistor includes a gate and a source and a drain, wherein one of the source or drain is in electrical contact with the first contact point (P1) and the other of the source or drain is in electrical contact with the second contact point (P2) and the gate is in electrical contact with a control signal provided by the storage elements; and wherein a second transistor includes a gate and a source and a drain, wherein one of the source or drain is in electrical contact with the first contact point (P1) and the other of the source or drain is in electrical contact with the third contact point (P3) and the gate is in electrical contact with a signal that is a complement of the control signal.

According to another embodiment, a reflectarray comprising a plurality of the semiconductor devices described above, arranged in a tiled array, is disclosed. In some embodiments, a spacing between two adjacent patch antennas disposed on a same semiconductor device is within 20% of a spacing between two adjacent patch antennas disposed on different semiconductor devices. In some embodiments, the plurality of semiconductor devices are soldered onto a printed circuit board and wire bonding is used to connect signals between adjacent semiconductor devices. In some embodiments, some of the signals are duplicated such that isolated wirebond open circuits have no impact on operation.

According to another embodiment, a terahertz imaging system is disclosed. The terahertz imaging system comprises the reflectarray described above; a transceiver, comprising a transmitter, a directional coupler, a mixer and a receiver; and a waveguide; wherein terahertz waves generated by the transmitter are transmitted through the directional coupler and through the waveguide to an opening at a distal end of the waveguide, where the terahertz waves are directed toward the reflectarray; and wherein waves reflected from an object are focused toward the distal end of the waveguide by the reflectarray, and travel through the waveguide, the directional coupler and the mixer before reaching the receiver.

According to another embodiment, a method of performing a sweep over a frequency range using the terahertz imaging system described above is disclosed. The method comprises computing a phase state for each patch antenna in the reflectarray at a plurality of frequencies within the frequency range; storing the computed phase states in the storage elements associated with each respective patch antenna; using the transmitter to transmit a plurality of frequencies in the frequency range; and changing the phase state provided to each patch antenna to accommodate the frequency transmitted by the transmitter.

According to another embodiment, a method of reducing sidelobes associated with quantization error using the terahertz imaging system described above is disclosed. The method comprises calculating a first set of phase values for each patch antenna in the reflectarray, based on frequency; quantizing the first set of phase values to obtain a first set of phase states; adding a constant phase offset to each phase value in the first set of phase values to generate a second set of phase values; quantizing the second set of phase values to obtain a second set of phase states; using the first set of phase states during a first integration; using the second set of phase states during a second integration; and summing or averaging results from the integrations. In some embodiments, the method comprises adding the constant phase offset to each phase value in the second set of phase values to generate a third set of phase values; quantizing the third set of phase values to obtain a third set of phase states; adding the constant phase offset to each phase value in the third set of phase values to generate a fourth set of phase values; quantizing the fourth set of phase values to obtain a fourth set of phase states; using the third set of phase states during a third integration; using the fourth set of phase states during a fourth integration; and including the third integration and fourth integration in the summing or averaging.

According to another embodiment, a method of reducing reflections associated with passive structures using the terahertz imaging system described above is disclosed. The method comprises calculating a first set of phase states for each patch antenna in the reflectarray; performing a first integration using the first set of phase states; inverting each phase state in the first set of phase states to create a second set of phase states for each patch antenna in the reflectarray; performing a second integration using the second set of phase states; and subtracting results of the second integration from results of the first integration, so that reflections associated with passive structures are cancelled.

BRIEF DESCRIPTION OF THE DRAWINGS

For a better understanding of the present disclosure, reference is made to the accompanying drawings, in which like elements are referenced with like numerals, and in which.

DETAILED DESCRIPTION

Figure 1A:
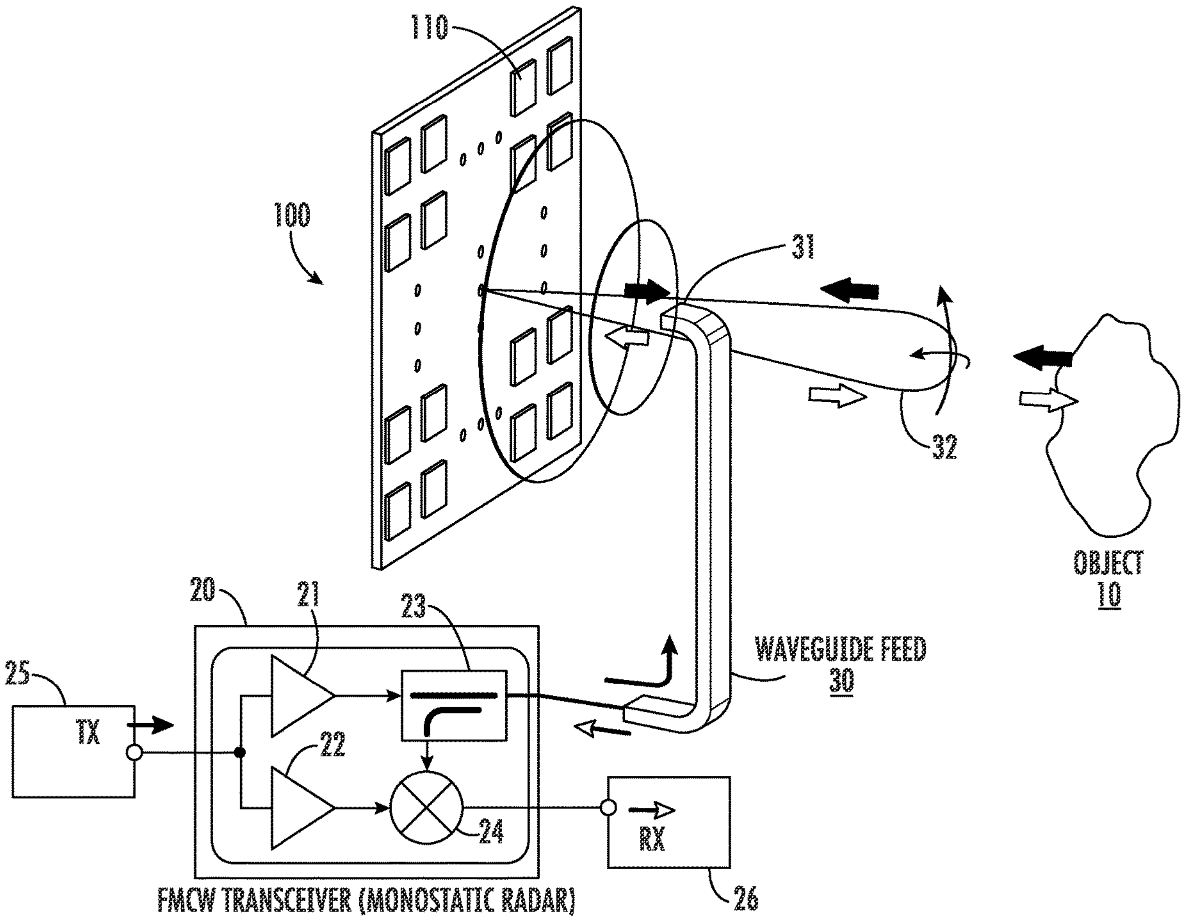
FIG. 1A shows a terahertz imaging system according to one embodiment.

FIG. 1A shows a terahertz imaging system according to one embodiment. In this disclosure, the terahertz waves may be in the frequency range from approximately 0.1 THz to 10 THz. The terahertz imaging system comprises a transceiver 20, which may be a frequency modulated continuous wave (FMCW) transceiver or a stepped frequency continuous wave (SFCW) transceiver. The transceiver 20 includes a transmitter 25. The signal to be transmitted (TX) by the transmitter 25 is provided to two drivers 21, 22. The output of the first driver 21 passes through a directional coupler 23. The directional coupler 23 may be any generic duplexing component capable of enabling an antenna's simultaneous use in both transmit and receive modes. Other types of directional couplers include Wilkinson power combiners, rat race couplers or circulators.

The output from the directional coupler 23 enters a waveguide 30, which directs the terahertz waves toward a terahertz antenna array 100, which may also be referred to as a reflectarray. The distal end 31 of the waveguide 30 defines an opening, through which the terahertz waves are emitted. The terahertz antenna array 100 may comprise a plurality of antenna elements 110. In some embodiments, there may be more than one hundred antenna elements. In certain embodiments, there may be more than a thousand antenna elements. The configuration of each antenna element will be described in more detail later.

The terahertz waves from the terahertz antenna array 100 are directed toward a target, such as object 10, which reflects some of that energy back toward the terahertz antenna array 100. The received reflected waves are then focused back toward the distal end 31 of the waveguide 30. These reflected waves travel through the waveguide 30 to the transceiver 20. The directional coupler 23 then directs the reflected waves toward a mixer 24. The mixer 24 receives the reflected waves and the output from the second driver 22 and generates a receive signal (RX), which can be analyzed and processed by a receiver 26.

Figure 1B:
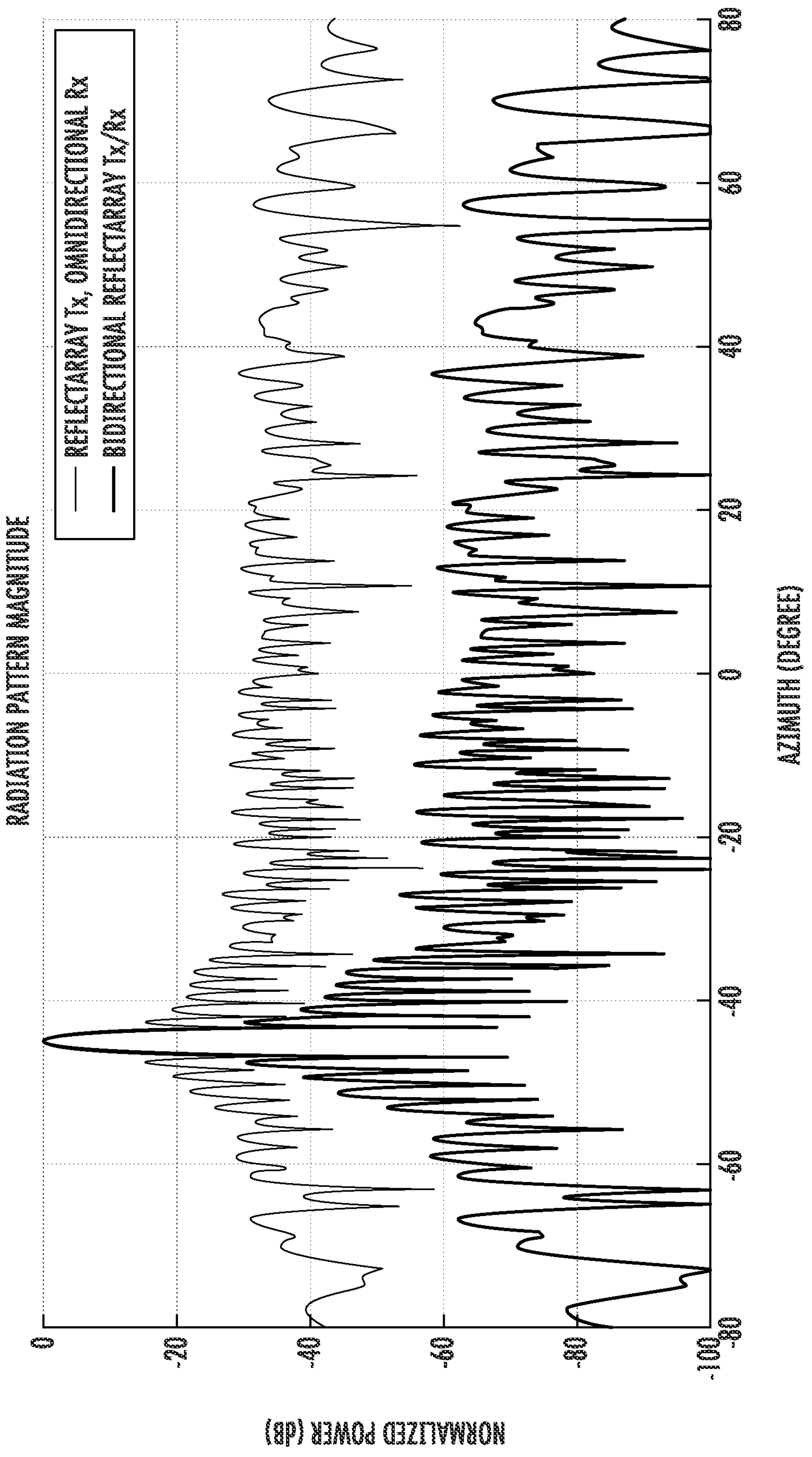
FIG. 1B shows the benefit of a bidirectional reflectarray.

By using the distal end 31 of the waveguide 30 as both the source of terahertz waves and the destination of the reflected waves, improved signal to noise ratios can be achieved. FIG. 1B shows a comparison of a terahertz reflectarray that uses an omnidirectional receiver and a terahertz reflectarray that utilizes a transceiver such that the waveguide 30 is used for both transmission and reception. Specifically, a terahertz reflectarray with an omnidirectional receiver displays about 20 dB difference between the peak power at the main lobe and the nearest sidelobe. Further, the difference between the peak power and the background noise is between 30 and 40 dB. By using the waveguide to also receive the reflected waves, this effect is compounded, such that the difference between the peak power at the main lobe and the nearest sidelobe is doubled, as is the difference between the peak power and the background noise.

The terahertz antenna array 100 is adapted to steer the signal from the waveguide 30 toward an object 10. Like a concave mirror, the antenna array, when illuminated by a signal radar source, applies incident angle dependent phase shifts to the incoming wave from the waveguide 30 and refocuses it in the desired direction. The antenna array is capable of generating a pencil beam 32 having a beamwidth of 1° in both directions.

Figure 2:
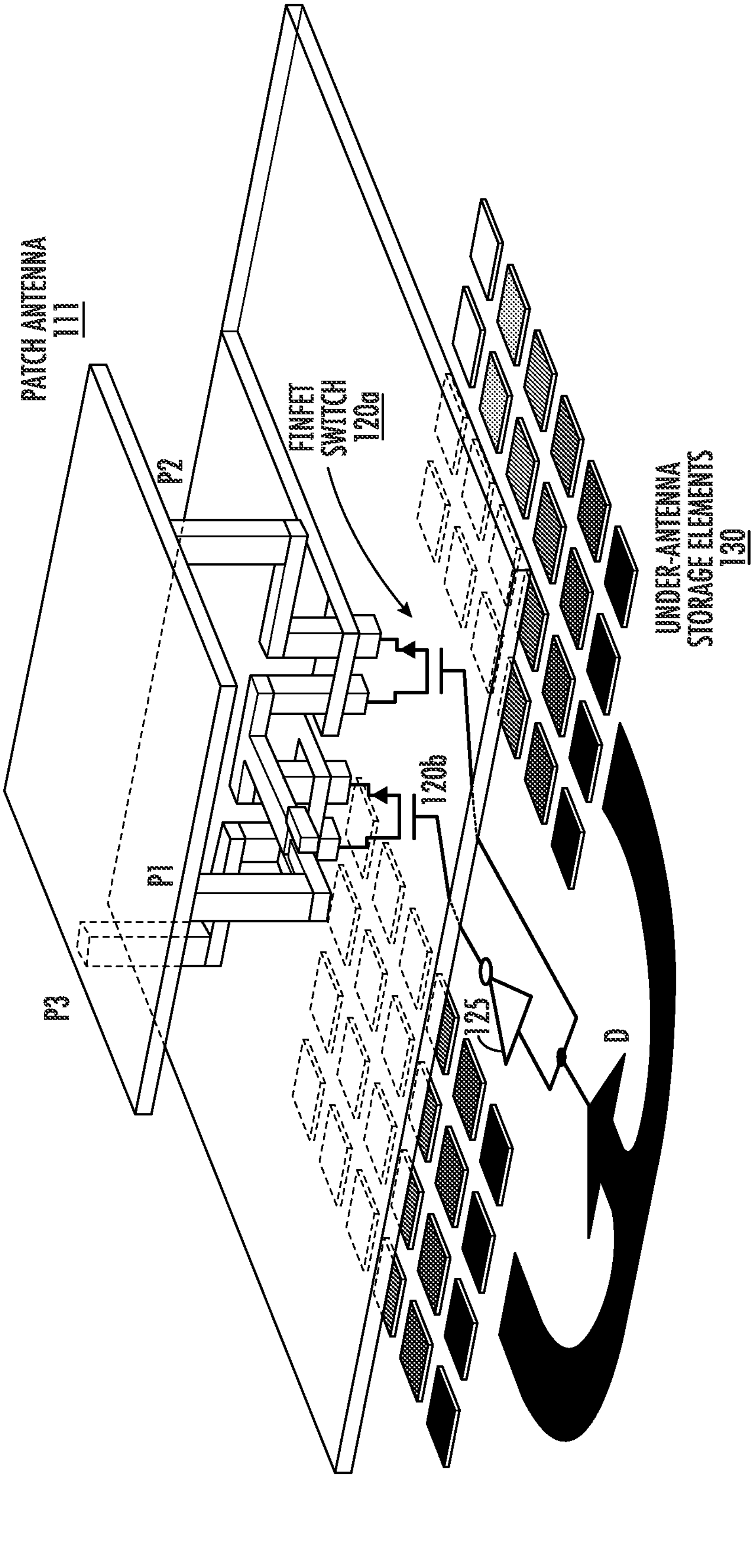
FIG. 2 shows the implementation of the one bit phase shifter according to one embodiment.

This is achieved through the use of a one bit phase shifter, which is shown in FIG. 2. The antenna element 110 comprises a patch antenna 111, constructed of a conductive material, such as a metal, that may be disposed on a top metal layer of a semiconductor device. The patch antenna 111 may be square or rectangles, having two pairs of parallel sides, which are perpendicular to one another. There are three contact points to the patch antenna 111; labelled P1, P2 and P3. Note that P1 is configured to receive and transmit signals having a different polarization than the signals received and transmitted from P2 and P3. Specifically, P2 and P3 utilize the same polarization, but differ in phase by 180°. Thus, P2 and P3 are disposed at the midpoints of opposite parallel sides, while P1 is disposed at the midpoint of a side that is perpendicular to these two parallel sides. P1 is in communication with P2 via a first transistor 120*a* while P1 is in communication with P3 via a second transistor 120*b*. In some embodiments, these transistors may be finFETs, although other geometries may also be used. Specifically, P3 is connected to the drain of the second transistor 120*b*; P2 is connected to the source of the first transistor 120*a*; and P1 is connected to the source of the second transistor 120*b* and the drain of the first transistor 120*a*. Note that these connections may be varied such that any of these contact points may be connected to the source or drain of the respective transistor. The gates of the first transistor 120*a* and the second transistor 120*b* are driven by complementary signals, such that when the first transistor 120*a* is enabled, the second transistor 120*b* is disabled. In some embodiments, these complementary signals are generated through the use of inverter 125. A signal D, also referred to as the phase state, is used as the input to the inverter 125 and also to the gate of first transistor 120*a*. However, it is understood that the complementary signals may be generated in other manners.

Figure 3:
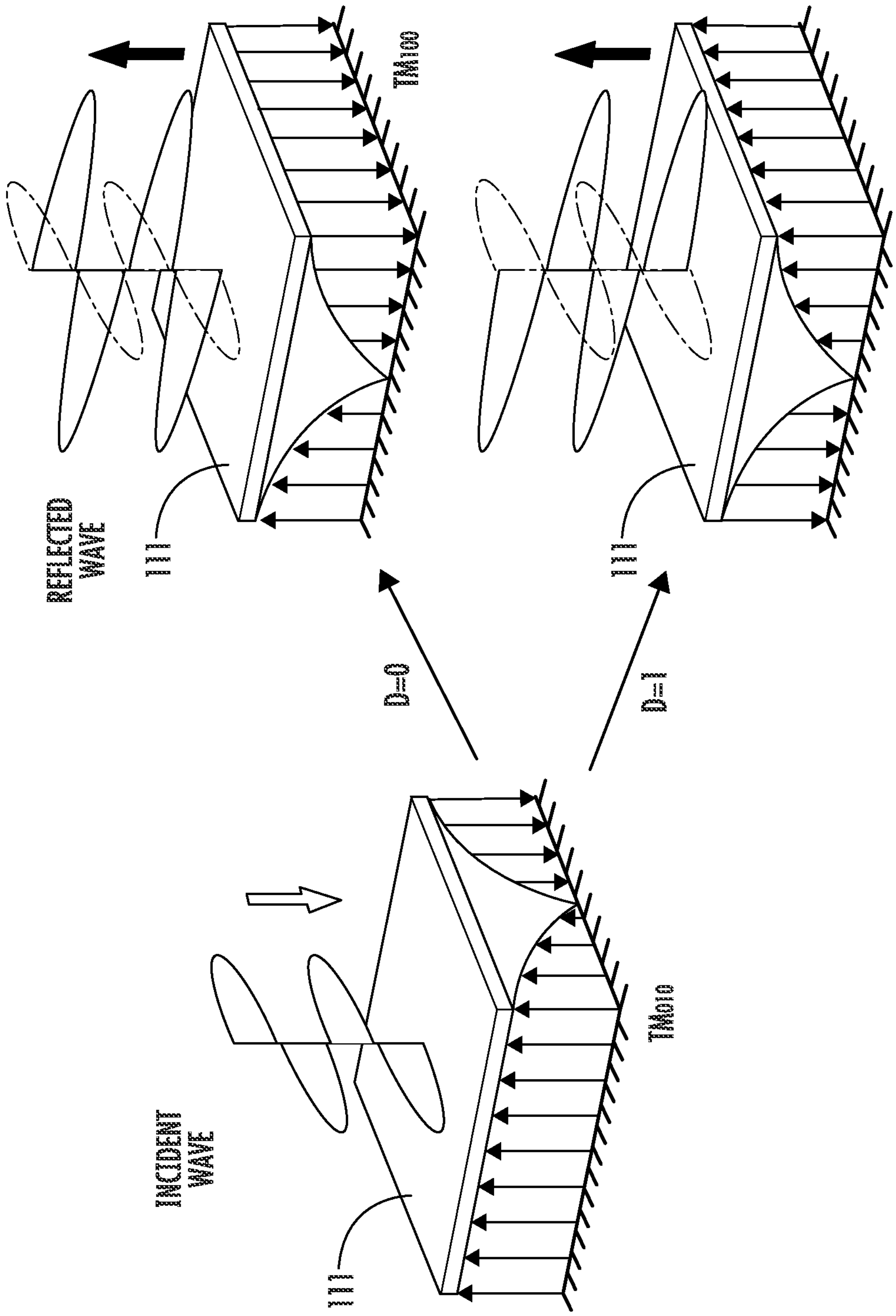
FIG. 3 shows the reflected wave based on the state of the phase shifter.

Thus, when the phase state (i.e., signal D) is asserted, contact point P1 is connected to P2 and is disconnected from P3. Conversely, when control signal D is deasserted, contact point P1 is connected to P3 and is disconnected from P2. The effect of this can be seen in FIG. 3. If it is assumed that the incident wave is vertically polarized, it can be seen that the reflected wave will be a horizontally polarized signal, regardless of the value of control signal D. If the control signal D is asserted, the reflected signal will radiate from a first side of the patch antenna 111, which in FIG. 2 is the right side as shown in the bottom right. If the control signal D is deasserted, the reflected signal will radiate from the opposite side of the patch antenna 111, which in FIG. 2 is the left side as shown in the top right. In this way, the one bit phase shifter is able to introduce a phase shift of 0° or 180°. Note that because MOSFETS (metal-oxide-semiconductor field effect transistors) are used as the first and second transistors, the flow of current is omnidirectional. Thus, current may flow from P1 to P2 or flow from P2 to P1 when control signal D is asserted and from P1 to P3 or P3 to P1 when control signal D is deasserted.

In a phased array antenna, two or more antennas are configured to radiate energy at the same frequency but with varying phases. The phases are chosen such that in the aggregate far-field, the individual radiated fields of each individual antenna constructively and/or destructively interfere in certain desired directions, thereby enabling solid-state control over the direction and shape of radiation. In a practical system, the control of the antennas' phases is often quantized to discrete values and the desired phase shift value is rounded to the nearest available quantized value. This quantization can be as extreme as one bit quantization, with two possible phase states and a step size of 180 degrees.

Returning to FIG. 2, it can be seen that disposed beneath the patch antenna 111 are one or more storage elements 130. The one or more storage elements 130 may be registers, such as shift registers, or may be memory elements. These storage elements 130 may be used to store a plurality of values, where each of these values corresponds to the state of control signal D at a particular point in time. In certain embodiments, there may be more than 1000 bits associated with each patch antenna 111. In some embodiments, there may be more than 50,000 bits associated with each patch antenna 111.

Figure 4:
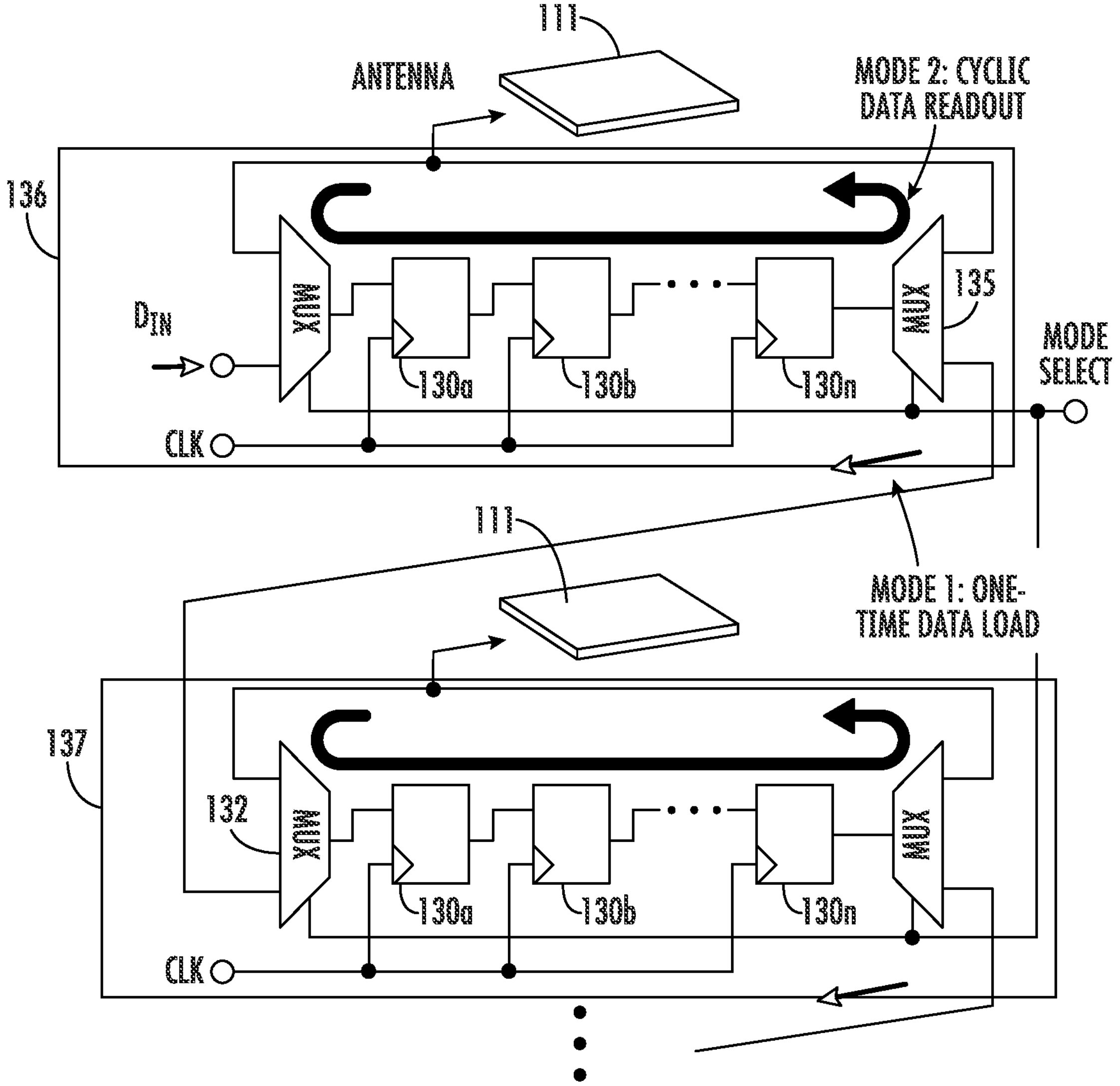
FIG. 4 shows a first embodiment of the storage elements disposed beneath each patch antenna.

As described above, FIG. 2 shows storage elements 130 disposed beneath each patch antenna 111. These storage elements 130 may be configured in several ways. In one embodiment, shown in FIG. 4, the storage elements 130*a*, 130*b*, . . . 130*n* are arranged as a shift register. While FIG. 4 shows two shift registers 136, 137, it is understood that any number of shift registers may be employed and the number of shift registers is typically the same as the number of antenna elements 110. In this configuration, the input and output paths of the shift registers 136, 137 may be connected through multiplexers so as to have two different modes. The input multiplexer 132 is used to select between the output from the last storage element 130*n* in the shift register 137 and the last storage element 130*n* in the previous shift register 136. The output multiplexer 135 is used to direct the output from the last storage element 130*n* to either the input multiplexer 132 of the shift register 136 or the input multiplexer 132 of the next shift register 137. In a first mode, or load mode, the output multiplexer 135 is configured such that the output of the last storage element 130*n* in the shift register of one antenna element 110 is selected as the input to the first storage element 130*a* of the shift register of the adjacent antenna element 110. In a second mode, or cyclic mode, the output of the last storage element 130*n* in the shift register of one antenna element 110 serves as the input to the first register of the shift register of that antenna element 110 and also serves as the control signal D that controls the phase of antenna element 110. In this way, the pattern stored in the shift register may be repeatedly applied to the antenna element 110, if desired. The selection of mode may be determined using two multiplexers, the input multiplexer 132 and the output multiplexer 135. Further, in the load mode, the output multiplexer 135 also serves to isolate the antenna elements 110 from the data that is being loaded as no signal is provided to the patch antennas 111 in this mode.

Thus, in load mode, all of the shift registers are arranged in series so that data can be loaded sequentially into all of the shift registers. In cyclic mode, the shift registers are configured such that the output from each shift register is fed back to the input of that respective shift register.

Figure 5:
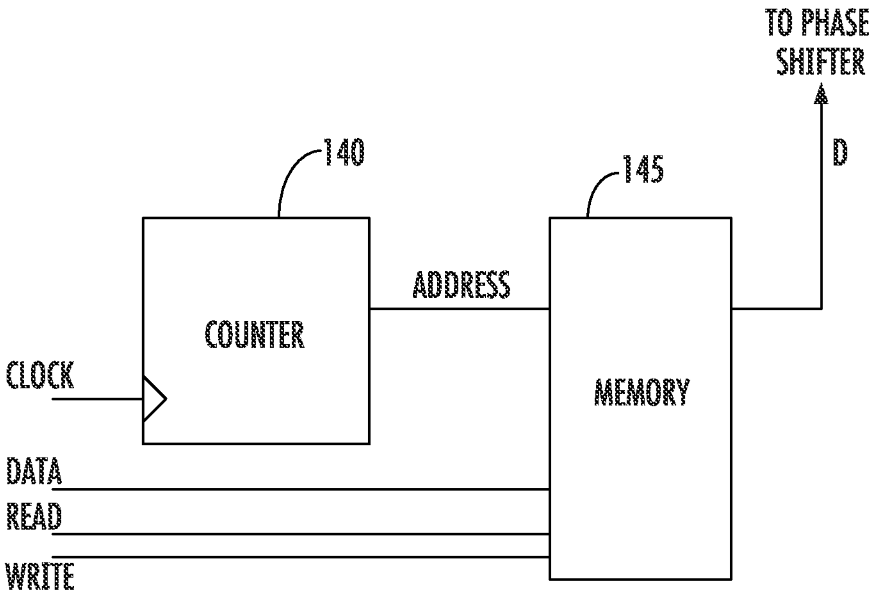
FIG. 5 shows a second embodiment of the storage elements disposed beneath each patch antenna.

FIG. 5 shows another embodiment. In this embodiment, the storage element 130 is a memory device 145. The memory device 145 may be 1 bit wide, such as 100K×1 bit, or some other configuration. To minimize the number of signals that are passed between each antenna element 110, each antenna element 110 may have a counter 140 which is used to provide the address to the memory device 145. For example, at initialization, all counters 140 may be reset. Each clock pulse causes the counter 140 to increment, allowing a different location in the memory device 145 to be written or read. The output of the memory device 145 may then serve as the control signal D shown in FIG. 2.

Thus, in FIG. 4, the input multiplexer 132 serves as control logic that enables the shift register to be preloaded in the first mode and cyclically presented to the one bit phase shifter in the second mode. In FIG. 5, the counter 140, the read signal, and the write signal serve as the control logic that allows the memory device 145 to be preloaded with data and then later presented to the one bit phase shifter in a sequential manner.

Figure 6:
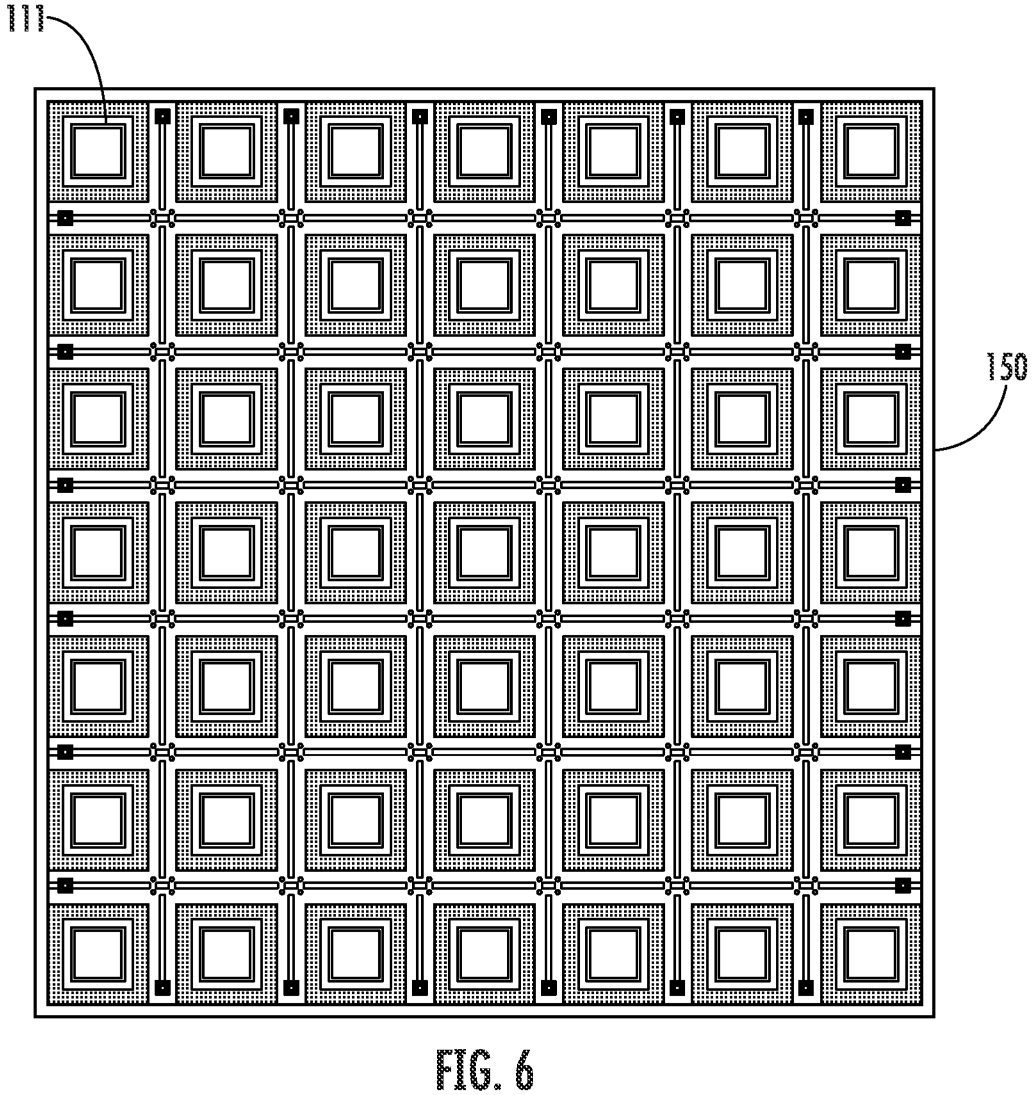
FIG. 6 shows one embodiment of a semiconductor device that is used as part of the terahertz antenna array.

FIG. 6 shows one embodiment of a semiconductor device 150 that includes a plurality of antenna elements, each having a respective patch antenna 111 and associated storage elements 130. The patch antennas 111 are disposed on the top metal layer of the semiconductor device 150. Further, the semiconductor device has a semiconductor substrate, which are disposed beneath the metal layers. The active components, which include the one bit phase shifters (i.e., the first transistor 120*a*, the second transistor 120*b* and the inverter 125) and the storage elements 130, are formed in the semiconductor substrate. Some of the lower metal layers are used as ground layers and to provide the interconnect between these active components. The top metal layer is reserved for use as the patch antenna 111. Further, the semiconductor device 150 is not packaged, such that the top metal layer is exposed. In this embodiment, the semiconductor device 150 includes 49 antenna elements, arranged in a grid having seven rows and seven columns. Of course, grids of other dimensions may be used. Each antenna element 110 comprises a patch antenna 111, the one bit phase shifter and the storage elements 130 disposed beneath that patch antenna 111. The patch antennas 111 are spaced apart such that there is roughly 0.5 wavelengths between each patch antenna 111 and its adjacent neighbor in both the horizontal and vertical directions. Importantly, since the terahertz antenna array 100 includes a plurality of these semiconductor devices 150, the patch antennas 111 are positioned such that the spacing between two patch antennas on the same semiconductor device 150 is the same as the spacing between adjacent patch antennas 111 on different semiconductor devices 150.

As noted above, the terahertz antenna array 100 includes a large number of semiconductor devices 150 in a tiled array, connected by a large number of bond wires. Given the scale and complexity of such an assembly, the risk of failures in chip fabrication or assembly is high. Accordingly, the I/O architecture of the array is designed to be robust, such that the most likely failure modes, such as isolated wirebond open circuits, have little or no impact on array operation.

Figure 7A:
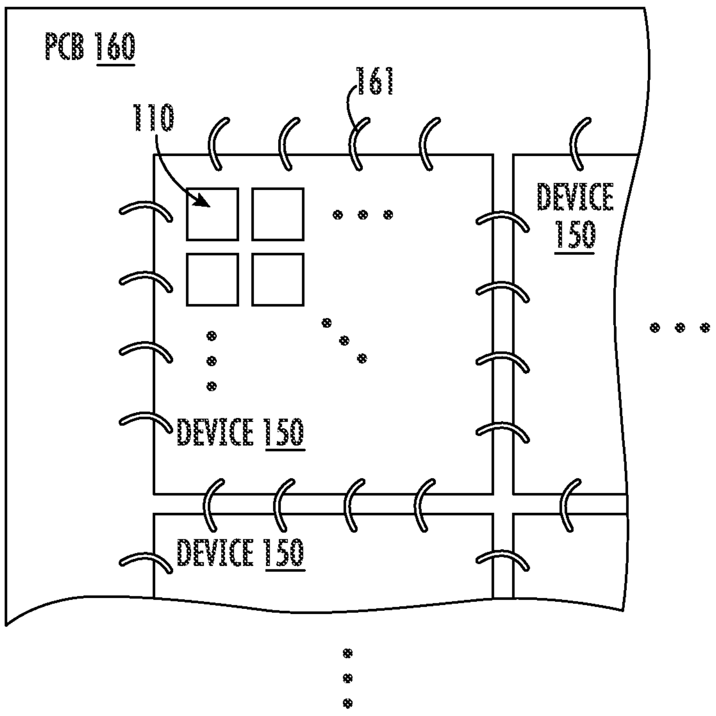
FIG. 7A shows the connection between semiconductor devices and to the printed circuit board.
Figure 7B:
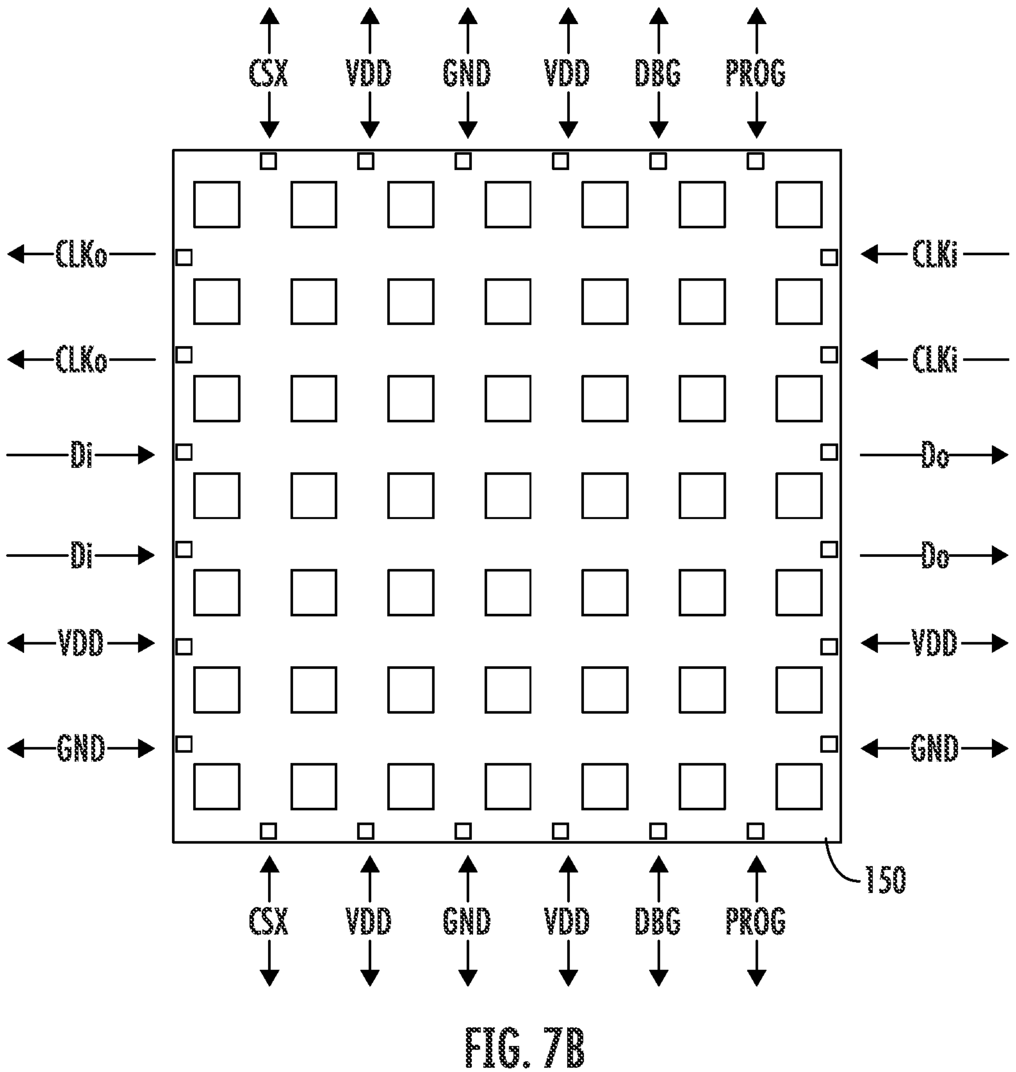
FIG. 7B shows the configuration of the I/O signals for each semiconductor device according to one embodiment.

For example, in one embodiment, shown in FIG. 7B, the clock and data signals for programming of phase states and cycling of phase states are fed between adjacent semiconductor devices 150 within a row. Further, each semiconductor device 150 may include multiple bond wires for the power, ground, data and clock signals. In this way, a wirebond open circuit can be tolerated without an impact on the functionality of the terahertz antenna array 100. Specifically, if one of the bond wires carrying the clock signal is not properly connected, the second redundant bond wire is able to propagate that clock signal.

FIG. 7A shows a view of several semiconductor devices 150 affixed to a printed circuit board 160. Each semiconductor device 150 includes a plurality of antenna elements 110. Additionally, signals, such as clock, data, power and ground are connected between the semiconductor devices 150 using bond wires 161. Additionally, the bond wires 161 from the semiconductor devices 150 along the edge of the terahertz antenna array 100 are affixed to the printed circuit board 160. The semiconductor devices 150 are preferably positioned such that the spacing between adjacent semiconductor devices 150 is such that the patch antennas are equally spaced across the entire array. Thus, the spacing between adjacent patch antennas 111 disposed on the same semiconductor device 150 is roughly the same as the spacing between adjacent patch antennas 111 disposed on adjacent semiconductor devices. In some embodiments, these spacings may be within 20% of each other. Though not shown, the printed circuit board 160 may include other circuitry, such as power conditioning circuitry, clock generation circuitry, debug circuitry, and connections to external components. FIG. 7B shows that the clock, data, power and ground signals all include multiple bond wires. Further, as shown in FIG. 7B, the power, ground, data and clock signals are disposed on opposite sides of the semiconductor devices. In this way, there is little routing requiring on the underlying printed circuit board, since the semiconductor devices 150 serve to route these signals from one side of the device to the opposite, as shown in FIG. 7A. For example, the clock signals are provided as inputs on a first side, and exit the semiconductor device 150 on the opposite second side. The data, ground and power signals are similarly configured. In this way, the clock and data signals are fed in a horizontal direction. Additionally, control signals and additional power and ground signals are provided as inputs to a third side of the semiconductor device and exit the semiconductor device 150 on the opposite fourth side. In this way, the control signals are fed in a vertical direction of the tiled array. For redundancy, power and ground signals are fed along both the horizontal and vertical directions of the tiled array. Of course, the directions of the various signals are a design choice and the signals may be interchanged without departing from the spirit of this disclosure. For example, data and clock signals may be fed along the vertical direction and control signals may be provided along the horizontal direction.

Figure 8:
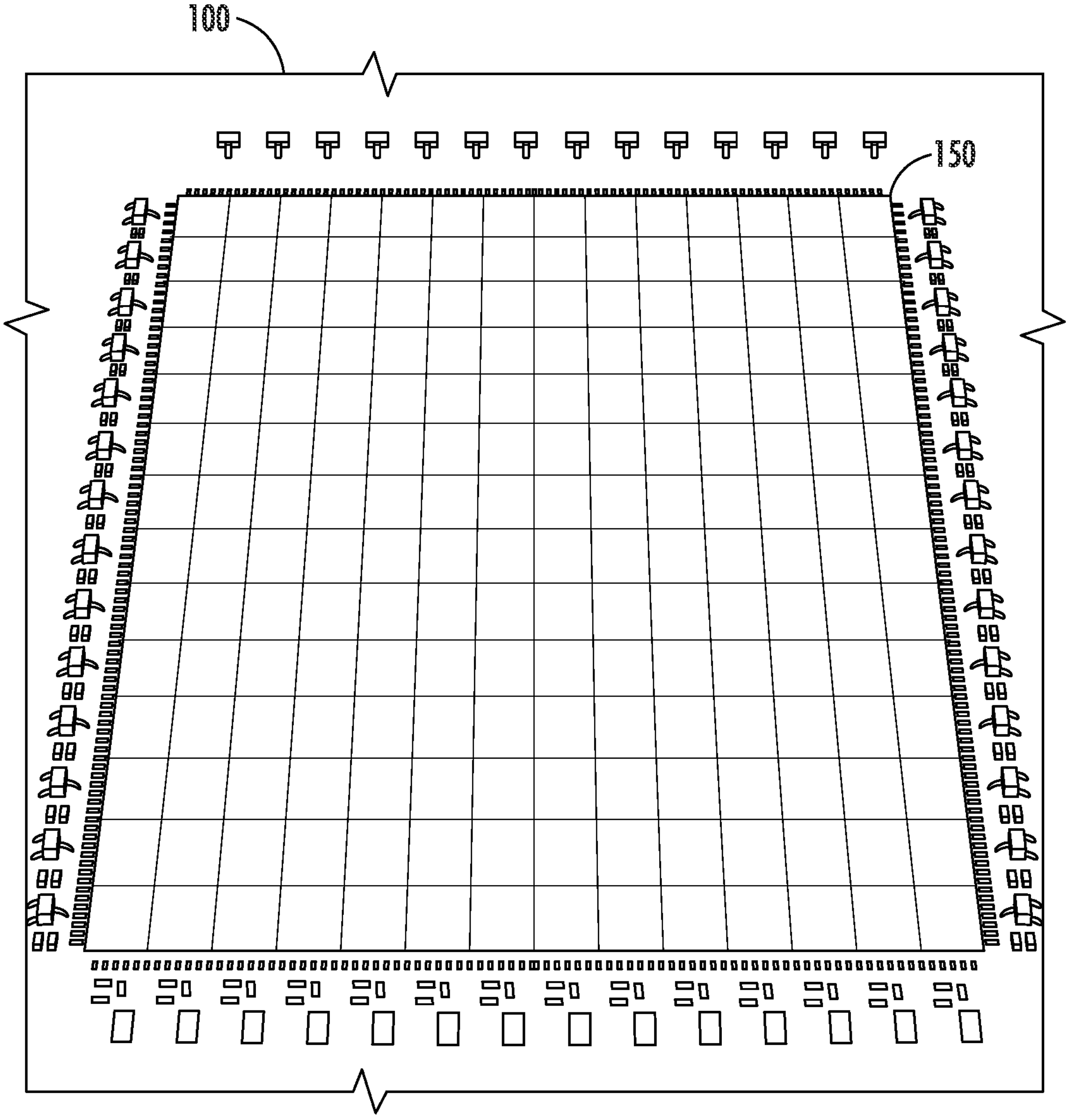
FIG. 8 shows the assembled terahertz antenna array according to one embodiment.

FIG. 8 shows the assembled terahertz antenna array 100 according to one embodiment.

Figure 9:
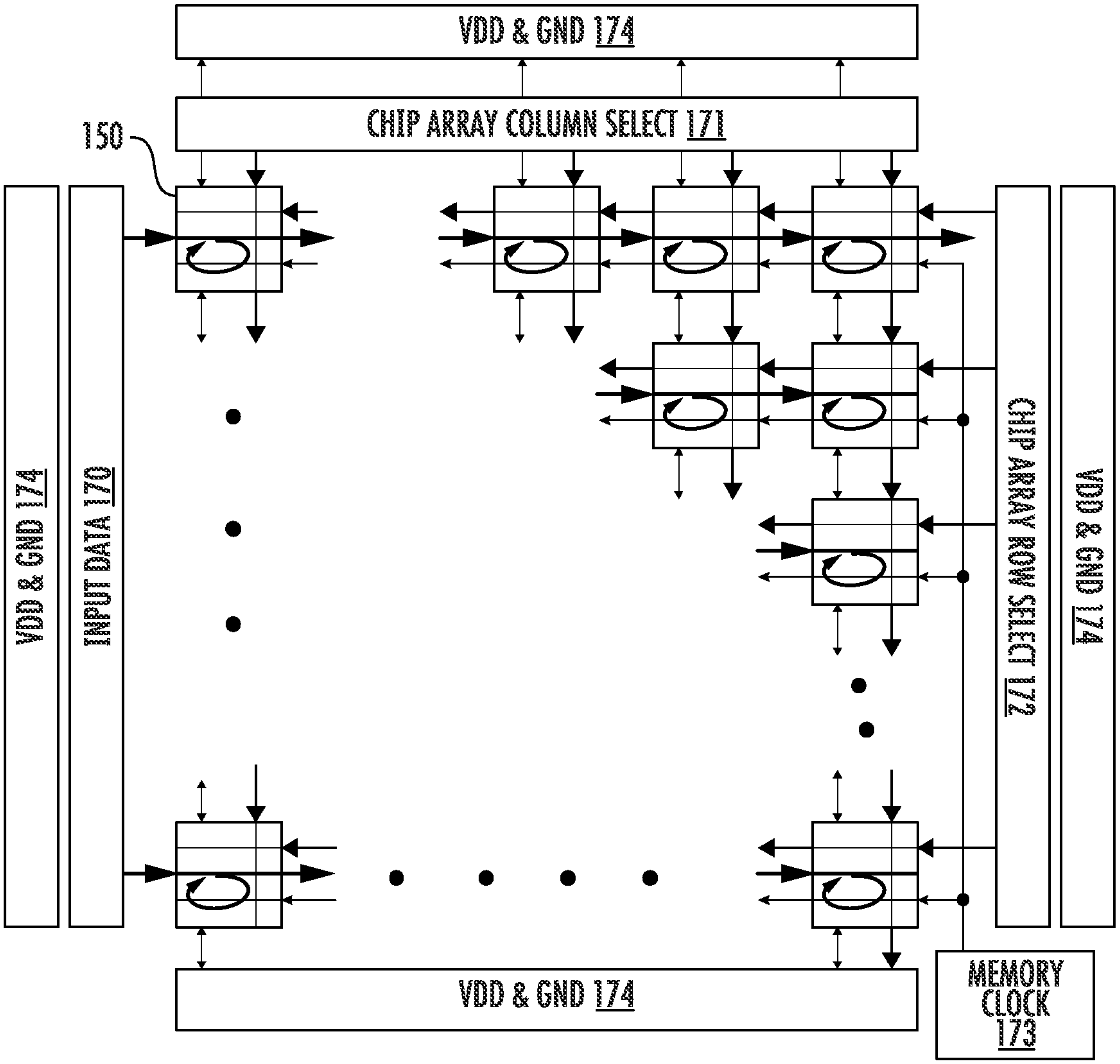
FIG. 9 shows a detailed illustration of the terahertz antenna array according to one embodiment.

FIG. 9 shows a more detailed view of the assembled terahertz antenna array 100 shown in FIG. 8. An array of semiconductor devices 150 are arranged on the printed circuit board 160. As described in FIG. 7B, the semiconductor devices 150 may be configured such that certain signals pass from one semiconductor device 150 to an adjacent device in the horizontal direction, while other signals pass from one device to an adjacent device in the vertical direction. In this illustration, a clock generation circuit 173 is used to generate the clock signal to all of the semiconductor devices 150. The input data for the array may be provided by the data circuit 170. The data and clock signals pass in the horizontal direction. Power conditioning circuitry 174 may be disposed around the periphery of the array. In some embodiments, column select circuitry 171 and row select circuitry 172 may be used to individually address semiconductor devices 150 within the array.

Thus, the terahertz antenna array comprises a plurality of semiconductor devices 150, wherein each semiconductor device 150 includes a plurality of antenna elements 110. Each antenna element 110 comprises a patch antenna 111 disposed on the top metal layer of the semiconductor device 150. Each antenna element 110 also includes a one bit phase shifter in communication with the respective patch antenna 111. Each antenna element 110 also includes storage elements 130 disposed beneath the respective patch antenna 111 to store a plurality of phase states (also referred to as signal D), which are provided to the one bit phase shifter. The storage elements 130 also include control logic that enables data to be loaded into the storage elements 130 and accessed at a later time. In some embodiments, the control logic allows the data stored in the storage elements 130 to be presented to the one bit phase shifter associated with the patch antenna 111 in a sequential, and optionally in a cyclical, manner.

The semiconductor devices 150 are not packaged, so that the top metal layer is exposed. These bare semiconductor devices are soldered onto a printed circuit board 160 and wire bonding is used to connect signals between devices. Wire bonding is also used to connect signals from the array to and from the printed circuit board.

A terahertz antenna array 100 constructed in accordance with the teaching of this disclosure enables a variety of different applications and tuning algorithms.

One such algorithm relates to beam squint. Beam squint is a performance-degrading effect in wideband frequency modulated continuous wave (FMCW) phased array radars and step frequency continuous wave phase array radars. This effect arises from the fact that in a phased array antenna, the phases for beamforming are set based on an operating frequency, often the center frequency of the frequency sweep. During the radar's operation, the phased array will experience varying instantaneous frequencies during the sweep of frequencies, also referred to as a chirp. The difference between the instantaneous frequency and the frequency assumed during beamforming phase calculation leads to an error which manifests as beam squint. For example, a 10 GHz bandwidth in a classical phased array system with a single set of phases can result in a beam squint exceeding three degrees in typical applications. This increases the effective beamwidth seen during one chirp of radar operation, reducing the effective resolution of the resulting radar image, particularly at wide angles from boresight.

However, the present antenna array can mitigate this issue. For example, the frequency sweep, or chirp, may cover 10 GHZ. The phase of each antenna element 110 in the antenna array may be computed for a plurality of different frequencies in that frequency range. In one embodiment, the phase for each antenna element 110 in the antenna array is computed at every integral GHz frequency. Thus, there are ten different phase states computed for each antenna element for this frequency range. These ten phase states are then stored in the storage elements associated with each respective antenna element 110. As the transceiver 20 changes frequency, the data supplied to the one bit phase shifters may be changed to accommodate the new frequency. This pattern may repeat as the transceiver 20 sweeps across a range of frequencies. To achieve this, the technique requires synchronization between the low-frequency signal used to vary the FMCW signal and the antenna array's clock signal to coordinate programmed phase states during a chirp sequence. In other words, as the frequency transmitted by the transceiver 20 is modified, the phase states provided to each of the one bit phase shifters in the plurality of antenna elements may also be updated. This may occur for each change in transmitted frequency or may change at a regular interval, such as every GHz. In certain embodiments, the transceiver is a FMCW transceiver; while in other embodiments, the transceiver is a SFCW transceiver. This approach is operable with both types of transceiver. In all embodiments, the phase state supplied to each patch antenna is modified a plurality of times during the frequency sweep. In some embodiments, there may be as few as two different phase states used during the frequency sweep. In other embodiments, there may be 10 or more phase states used during the frequency sweep.

Figure 10A:
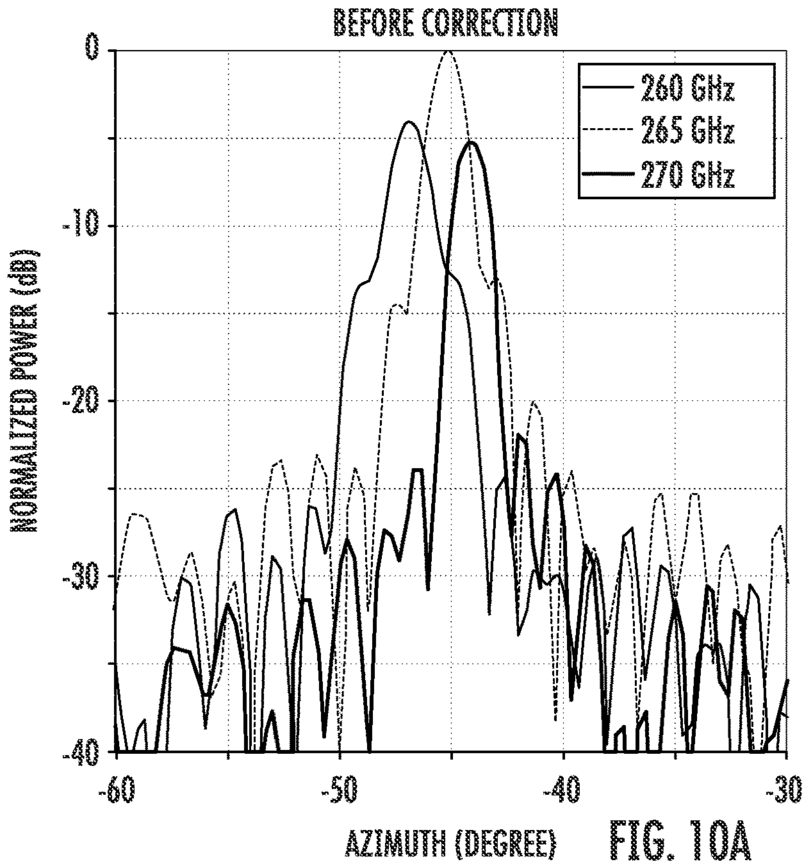
FIGS. 10A-10B show the effect of dynamic phase state changing on beam squint.
Figure 10B:
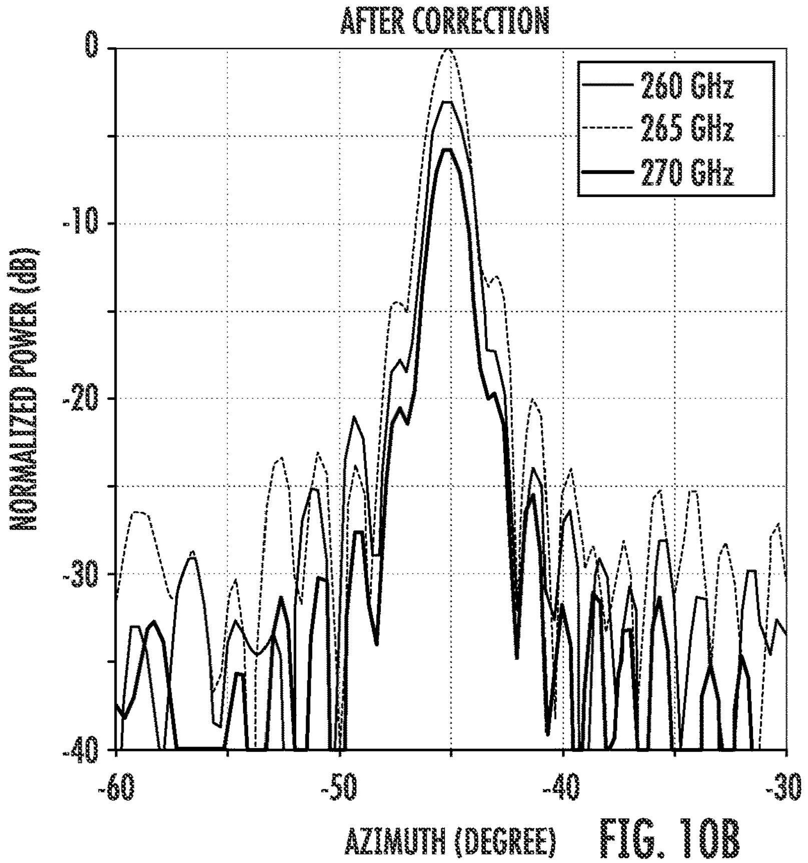

FIGS. 10A-10B show the benefit of synchronizing the phase states to the frequency of the transceiver 20. In FIG. 10A, normalized power is shown as a function of azimuth angle for three different frequencies. Note that in FIG. 10A, the phase states are not changed as the frequency is varied. Consequently, the peak power at the center frequency (265 GHZ) occurs at an azimuth angle of −45°. However, the peak power for the lower frequency (260 GHZ) occurs at an azimuth angle of roughly −47°, while the peak power for the higher frequency (270 GHZ) occurs at an azimuth angle of roughly −44°. However, as shown in FIG. 10B, by changing the phase states to correspond to the frequency being transmitted by the transceiver 20, the peak power for all three frequencies is centered at −45°. This improves the effective resolution of the resulting radar image as compared to the configuration shown in FIG. 10A.

Figure 11:
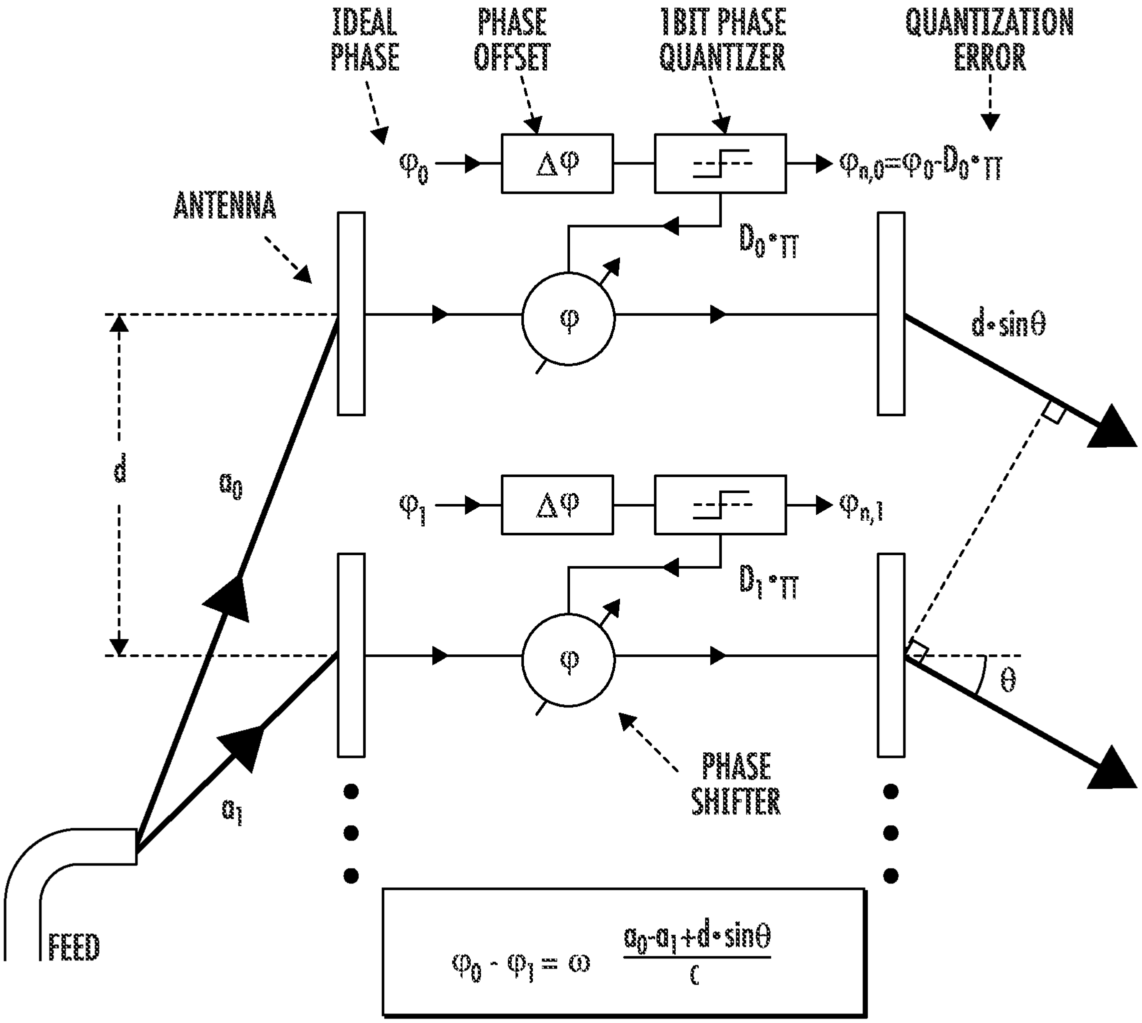
FIG. 11 shows an algorithm for sidelobe mitigation.
Figure 12:
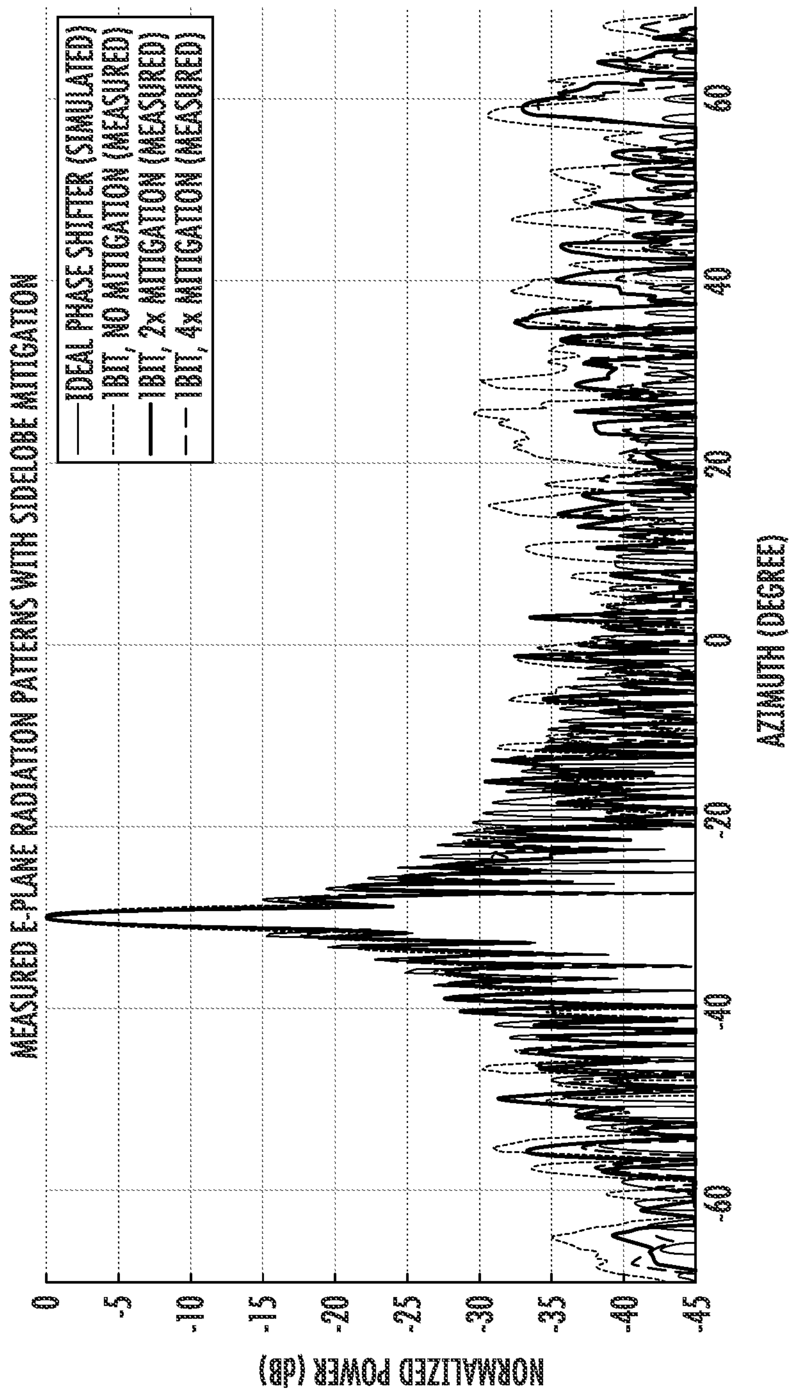
FIG. 12 shows the result of the sidelobe mitigation algorithm.

Another issue with quantized phase shifters that may be addressed by the reflectarray described in this disclosure is associated with sidelobe generation. With imaging radar systems, large sidelobes, combined with a non-sparse environment may result in false returns, which are indistinguishable from the returns in the desired direction. One bit phase shifters introduce quantization error, as shown in FIG. 11. A time dithering algorithm may be used to mitigate this quantization error and reduce the magnitude of associated side lobes. Specifically, phase values may be calculated for each of the antenna elements 110 using known techniques. These calculated phase values are shown as $\varphi_0$ and $\varphi_1$ in FIG. 11. A phase offset term $\Delta_\varphi$ is added to the calculated phase values (e.g., $\varphi_0$ and $\varphi_1$) of all antenna elements 110 before quantization. This phase offset term is constant across the entire array at each instant, but varies with time during multiple integrations of the radar imager. As integration is defined as one sweep across the frequency range. The inclusion of this phase offset term $\Delta\varphi$ alters the quantized states of each antenna element, flipping the phase of some antenna elements from 0° to 180° or vice-versa. In doing so, the sidelobes may be reduced. FIG. 12 shows that an unmitigated one bit phase shifter may introduce multiple sidelobes that have a normalized power greater than −35°. This is in contrast to an ideal phase shifter where the sidelobes exponentially decrease moving away from the main lobe.

Thus, in this embodiment, the phase states for each antenna element are calculated using the time dithering algorithm described above. These phase states are then stored in the respective storage elements 130. A clock signal is used to cycle the antenna elements through the various phase states to achieve the desired pattern. In one test, the term $\Delta\varphi$ was assigned two values (which may be 0° and 90°), and the phase states of each of the antenna elements was calculated at these two values. The two phase states are then used during two integrations. In a second test, the term $\Delta\varphi$ was assigned four values (which may be 0°, 45°, 90°, and 135°), and the phase states of each of the antenna elements was calculated at these four values. The four phase states are then used during four integrations. Of course, the phase offset term $\Delta\varphi$ may be assigned any number of values, and the phase states associated with each different phase offset term $\Delta\varphi$ are stored in the respective storage elements. The results from the various integrations may then be summed or averaged. The values associated with the main lobe add coherently, while the values associated with the various side lobes add incoherently. Note that the magnitude of the sidelobes is reduced by roughly 5 dB with the use of this time dithering algorithm.

This time dithering algorithm, and the beam squint algorithm described above, are possible because of the storage elements that are dedicated to the one bit phase shifter of each antenna element.

Figure 13:
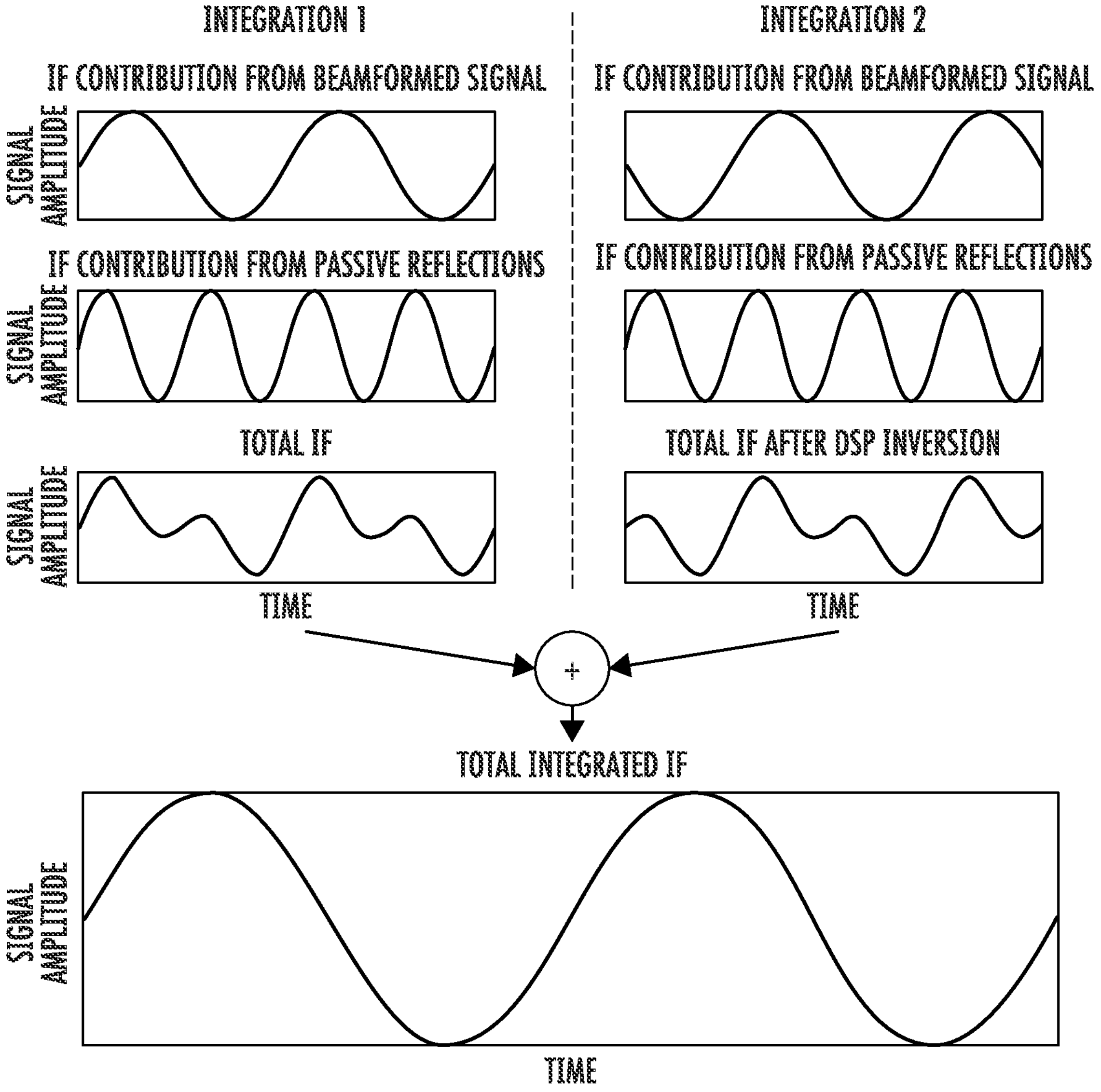
FIG. 13 shows a technique to eliminate unwanted reflections.

This configuration of the terahertz array also allows for other advanced features. For example, in certain embodiments, the terahertz beam directed toward the reflectarray also contacts passive structures, causing undesirable reflections that interfere with the beamformed field. These undesirable reflections may reduce the signal-to-noise ratio (SNR). This effect can be mitigated using the technique shown in FIG. 13. A first integration is performed, as shown on the left side of the figure. This integration includes the contribution from the beamformed image (top left), as well as the contribution from unwanted passive reflections (middle left). The result is shown as the total IF. A second integration is then performed. In the second integration, the value of each one bit phase shifter in the entire terahertz antenna array is changed, such that all "1" values are changed to "0" and all "0" values are changed to "1". This has the effect of changing the phase of the beam formed signal by 180°, as compared to the first integration (top right). However, this inversion of the phase states does not affect the contribution from the unwanted passive reflections (middle right). Thus, the total IF from the second integration is shown in the lower right. The results from the second integration are then subtracted from the results of the first integration to yield the final output, shown at the bottom of FIG. 13. Note that since the contribution from the passive reflections is constant, the subtraction of the two results eliminates this contribution, leaving only the reflections based by the beamformed field.

The present system has several applications. For example, the present system may be used for real time imaging, where the beam focused by the reflectarray is sequentially directed toward a plurality of points in a two dimensional array. Additionally, the present system may be used in communications systems, wherein the phase states may be calculated so as to move the focused beam to track a moving communications target such as a satellite.

The present system has many advantages. The reflectarray comprises a large number of antenna elements. Each antenna element utilizes a plurality of storage elements that are configured to provide a plurality of phase states to the one bit phase shifter associated with that respective antenna element. In some embodiments, more than 1000 phase states may be stored for each antenna element. This allows the reflectarray to perform functions and algorithms that were previously not possible. Additionally, the configuration of the semiconductor device that contains these antenna elements is designed such that a large number may be disposed in a two dimensional array on a printed circuit beam, allowing the creation of very large reflect arrays.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is limited thereto and that the present disclosure may be beneficially implemented in any number of environments for any number of purposes. Accordingly, the claims set forth below should be construed in view of the full breadth and spirit of the present disclosure as described herein.

What is claimed is:

1. A semiconductor device, comprising:

a semiconductor substrate; and a plurality of metal layers, including a top metal layer which is exposed;

wherein the top metal layer is formed as a plurality of patch antennas, wherein each patch antenna is a rectangle having two sets of parallel sides and comprises three contact points, a first contact point (P1); a second contact point (P2) disposed at a midpoint of a first side; and a third contact point (P3) disposed at a midpoint of a second side, opposite the first side, and wherein the first contact point (P1) is disposed at a midpoint of a side that is perpendicular to the first side and the second side; and wherein a plurality of storage elements and a one bit phase shifter is disposed in the semiconductor substrate beneath each respective patch antenna, wherein the plurality of storage elements stores a plurality of phase states that are supplied to the one bit phase shifter, and wherein the one bit phase shifter comprises two field effect transistors (FETs), wherein a first transistor includes a gate and a source and a drain, wherein one of the source or drain is in electrical contact with the first contact point (P1) and the other of the source or drain is in electrical contact with the second contact point (P2) and the gate is in electrical contact with a control signal provided by the storage elements; and wherein a second transistor includes a gate and a source and a drain, wherein one of the source or drain is in electrical contact with the first contact point (P1) and the other of the source or drain is in electrical contact with the third contact point (P3) and the gate is in electrical contact with a signal that is a complement of the control signal.

2. The semiconductor device of claim 1, wherein the plurality of storage elements disposed beneath each respective patch antenna contains at least 1000 phase states.

3. The semiconductor device of claim 1, wherein the plurality of patch antennas are arranged as a grid having a first number of rows and a second number of columns.

4. The semiconductor device of claim 1, wherein each storage element of the plurality of storage elements comprises a shift register.

5. The semiconductor device of claim 4, wherein the semiconductor device has two modes: a load mode wherein all shift registers in the semiconductor device are arranged in series and data are loaded sequentially into all shift registers, and a cyclic mode wherein an output of each shift register is provided to an input of that shift register.

6. The semiconductor device of claim 1, wherein the plurality of storage elements comprises a random access memory (RAM).

7. A reflectarray comprising a plurality of the semiconductor devices of claim 1, arranged in a tiled array.

8. The reflectarray of claim 7, wherein a spacing between two adjacent patch antennas disposed on a same semiconductor device is within 20% of a spacing between two adjacent patch antennas disposed on different semiconductor devices.

9. The reflectarray of claim 7, wherein the plurality of semiconductor devices are soldered onto a printed circuit board and wire bonding is used to connect signals between adjacent semiconductor devices.

10. The reflectarray of claim 9, wherein some of the signals are duplicated such that isolated wirebond open circuits have no impact on operation.

11. A terahertz imaging system, comprising:

the reflectarray of claim 9;

a transceiver, comprising a transmitter, a directional coupler, a mixer and a receiver; and a waveguide;

wherein terahertz waves generated by the transmitter are transmitted through the directional coupler and through the waveguide to an opening at a distal end of the waveguide, where the terahertz waves are directed toward the reflectarray; and wherein waves reflected from an object are focused toward the distal end of the waveguide by the reflectarray, and travel through the waveguide, the directional coupler and the mixer before reaching the receiver.

12. A method of performing a sweep over a frequency range using the terahertz imaging system of claim 11, comprising:

computing a phase state for each patch antenna in the reflectarray at a plurality of frequencies within the frequency range;

storing the computed phase states in the storage elements associated with each respective patch antenna;

using the transmitter to transmit a plurality of frequencies in the frequency range; and changing the phase state provided to each patch antenna to accommodate the frequency transmitted by the transmitter.

13. A method of reducing sidelobes associated with quantization error using the terahertz imaging system of claim 11, comprising:

calculating a first set of phase values for each patch antenna in the reflectarray, based on frequency;

quantizing the first set of phase values to obtain a first set of phase states;

adding a constant phase offset to each phase value in the first set of phase values to generate a second set of phase values;

quantizing the second set of phase values to obtain a second set of phase states;

using the first set of phase states during a first integration;

using the second set of phase states during a second integration; and summing or averaging results from the integrations.

14. The method of claim 13, further comprising:

adding the constant phase offset to each phase value in the second set of phase values to generate a third set of phase values;

quantizing the third set of phase values to obtain a third set of phase states;

adding the constant phase offset to each phase value in the third set of phase values to generate a fourth set of phase values;

quantizing the fourth set of phase values to obtain a fourth set of phase states;

using the third set of phase states during a third integration;

using the fourth set of phase states during a fourth integration; and including the third integration and fourth integration in the summing or averaging.

15. A method of reducing reflections associated with passive structures using the terahertz imaging system of claim 11, comprising:

calculating a first set of phase states for each patch antenna in the reflectarray;

performing a first integration using the first set of phase states;

inverting each phase state in the first set of phase states to create a second set of phase states for each patch antenna in the reflectarray;

performing a second integration using the second set of phase states; and subtracting results of the second integration from results of the first integration, so that reflections associated with passive structures are cancelled.

16. A terahertz imaging system, comprising:

a reflectarray comprising a plurality of semiconductor devices, arranged in a tiled array, wherein each semiconductor device comprises:

a semiconductor substrate; and a plurality of metal layers, including a top metal layer which is exposed;

wherein the top metal layer is formed as a plurality of patch antennas, and wherein a plurality of storage elements and a one bit phase shifter is disposed in the semiconductor substrate beneath each respective patch antenna, wherein the plurality of storage elements stores a plurality of phase states that are supplied to the one bit phase shifter;

a transceiver, comprising a transmitter, a directional coupler, a mixer and a receiver; and a waveguide;

wherein terahertz waves generated by the transmitter are transmitted through the directional coupler and through the waveguide to an opening at a distal end of the waveguide, where the terahertz waves are directed toward the reflectarray; and wherein waves reflected from an object are focused toward the distal end of the waveguide by the reflectarray, and travel through the waveguide, the directional coupler and the mixer before reaching the receiver.

17. A method of performing a sweep over a frequency range using the terahertz imaging system of claim 16, comprising:

computing a phase state for each patch antenna in the reflectarray at a plurality of frequencies within the frequency range;

storing the computed phase states in the storage elements associated with each respective patch antenna;

using the transmitter to transmit a plurality of frequencies in the frequency range; and changing the phase state provided to each patch antenna to accommodate the frequency transmitted by the transmitter.

18. A method of reducing sidelobes associated with quantization error using the terahertz imaging system of claim 16, comprising:

calculating a first set of phase values for each patch antenna in the reflectarray, based on frequency;

quantizing the first set of phase values to obtain a first set of phase states;

adding a constant phase offset to each phase value in the first set of phase values to generate a second set of phase values;

quantizing the second set of phase values to obtain a second set of phase states;

using the first set of phase states during a first integration;

using the second set of phase states during a second integration; and summing or averaging results from the integrations.

19. The method of claim 18, further comprising:

adding the constant phase offset to each phase value in the second set of phase values to generate a third set of phase values;

quantizing the third set of phase values to obtain a third set of phase states;

adding the constant phase offset to each phase value in the third set of phase values to generate a fourth set of phase values;

quantizing the fourth set of phase values to obtain a fourth set of phase states;

using the third set of phase states during a third integration;

using the fourth set of phase states during a fourth integration; and including the third integration and fourth integration in the summing or averaging.

20. A method of reducing reflections associated with passive structures using the terahertz imaging system of claim 16, comprising:

calculating a first set of phase states for each patch antenna in the reflectarray;

performing a first integration using the first set of phase states;

inverting each phase state in the first set of phase states to create a second set of phase states for each patch antenna in the reflectarray;

performing a second integration using the second set of phase states; and subtracting results of the second integration from results of the first integration, so that reflections associated with passive structures are cancelled.

* * * * *